United States Patent
Meurer et al.

[11] Patent Number: 5,434,198
[45] Date of Patent: Jul. 18, 1995

[54] MOISTURE-CURING ONE-COMPONENT POLYSILOXANE COMPOUND

[75] Inventors: Willi Meurer, Koenigswinter; Wilhelm Weber, Leverkusen, both of Germany

[73] Assignee: Bayer Aktiengesellschaft, Leverkusen, Germany

[21] Appl. No.: 39,269

[22] Filed: May 12, 1993

Related Application Data

[63] Continuation-in-part of PCT/EP91/01909, Oct. 8, 1991.

[30] Foreign Application Priority Data

Oct. 18, 1990 [DE] Germany .................. 40 33 096.6

[51] Int. Cl.⁶ .................. C08K 9/10; C08L 83/04; C08G 77/26
[52] U.S. Cl. .................. 523/210; 524/863; 524/864; 524/858; 524/788; 528/18; 528/34; 528/38
[58] Field of Search .............. 524/863, 864, 858, 788; 523/210; 528/18, 34, 38

[56] References Cited

U.S. PATENT DOCUMENTS

| | | | |
|---|---|---|---|
| 3,364,160 | 1/1968 | Gölitz | 528/34 |
| 3,814,710 | 6/1974 | Duncan | 524/864 |
| 3,817,909 | 6/1974 | Toporcer et al. | 524/864 |
| 3,888,815 | 6/1975 | Bessmer et al. | 260/375 B |
| 4,001,168 | 1/1977 | Maass et al. | 524/863 |
| 4,105,617 | 8/1978 | Clark et al. | 260/31.2 N |
| 4,447,576 | 5/1984 | Fukayama et al. | 524/863 |
| 4,448,928 | 5/1984 | Klein et al. | 524/863 |
| 4,499,234 | 2/1985 | Pratt et al. | 524/864 |
| 4,810,748 | 5/1989 | Spells | 524/864 |
| 5,118,738 | 6/1992 | Berthet et al. | 524/863 |
| 5,260,372 | 11/1993 | Toporcer et al. | 524/863 |

FOREIGN PATENT DOCUMENTS

| | | |
|---|---|---|
| 0022976 | 1/1981 | European Pat. Off. |
| 0316591 | 5/1989 | European Pat. Off. |
| 1258087 | 1/1968 | Germany |

OTHER PUBLICATIONS

American National Standards Institute, "Standard Test Method for Rubber Property—Durometer Hardness" pp. 674–677.
German Ref. for DIN 52455, Apr. 1987.
International Standard ISO 8339 "Building construction—Jointing products—Sealants—Determination of tensile properties" 1984.
German References for DIN 53 505, Aug. 1973.

*Primary Examiner*—Melvyn I. Marquis
*Assistant Examiner*—Karen A. Dean
*Attorney, Agent, or Firm*—Sprung Horn Kramer & Woods

[57] ABSTRACT

This invention relates to one-component silicone systems (herein referred to as 1-C-RTV compounds) which cure rapidly under the effect of moisture with elimination of certain carbonamides, develop good adhesion to many substrates in the process and give vulcanizates that are stable under extreme climatic conditions.

3 Claims, No Drawings

MOISTURE-CURING ONE-COMPONENT POLYSILOXANE COMPOUND

This is a continuation-in-part of Application PCT/EP 9101909, filed Oct. 8, 1991, now pending.

This invention relates to one-component silicone systems (hereinafter referred to as 1-C-RTV compounds) which cure rapidly under the effect of moisture with elimination of certain carbonamides, develop good adhesion to many substrates in the process and give vulcanizates that are stable under extreme climatic conditions.

There have already been numerous publications on the subject of 1-C-RTV compounds which cure with elimination of carbonamides, of for example DE-A 1 224 039, 1 247 646, 1 258 087 and 3 114 773 and EP-A 22 976. The products claimed therein are generally distinguished by good adhesion to many substrates and show good stability in storage in the unvulcanized state. In most cases, however, they cure relatively slowly to form products of low hardness and are therefore only suitable to a limited extent for applications requiring rapid vulcanization to elastomers of high hardness. The compounds described in DE-A 3 114 773 come relatively close to the desired behavior standard. However, all the embodiments described therein are attended by the disadvantage that the vulcanizates produced from them can change under the effect of elevated temperature and atmospheric moisture, so that they can only be used to a limited extent for applications involving exposure to extreme climatic conditions.

The present invention relates to one-component silicone systems vulcanizable under the effect of moisture based on a mixture of
(A) typical hydroxy-terminated polydimethyl siloxanes having a viscosity of 1 to 100 Pa.s,
(B) optionally plasticizers,
(C) typical fillers,
(D) a dialkyl tin(IV) catalyst, characterized by a content—per 100 parts by weight (A)—of
(E) 2 to 30 parts by weight of a silane having the composition

in which
X is either

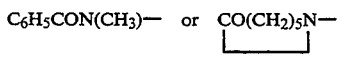

and
(F) 0.1 to 5 parts by weight of an aminoalkyl alkoxysilane containing one or more basic nitrogen atoms connected to a silicon atom by at least 3 carbon atoms,
the molar ratio of components (E) to (F) being at least 2.5.

Components (E) and (F) are preferably used in such quantities that the molar ratio does not fall below 3.

The molar ratio should preferably not exceed 10 and, more preferably, should not exceed 6.

It has now surprisingly been found that rapidly curing 1-C-RTV compounds which show good adhesion and excellent stability to extreme weathering influences can be obtained using the above-mentioned starting materials in the quantitative ratios indicated.

An $\alpha,\omega$-bis-(trimethylsiloxy)-polydimethyl siloxane having a viscosity of 0.01 to 10 Pa.s is preferably used as the plasticizer (B) in a quantity of, preferably, 0 to 100 parts by weight and, more preferably, 30 to 100 parts by weight, based on 100 parts by weight of component (A).

The polysiloxanes mentioned as components (A) and (B) correspond to the prior art and may be obtained by known methods. According to the invention, they may even be replaced by other polymer raw materials corresponding to the prior art, for example by polysiloxanes containing other substituents in addition to methyl radicals. Phenyl or vinyl radicals are mentioned as examples of such substituents. Organic polymers, in particular aromatic or aliphatic hydrocarbons which are predominantly branched may also be used as the plasticizer component instead of the polysiloxanes mentioned under (B).

The amidosilanes (E) may be obtained from methyl ethoxydichlorosilane and N-methyl benzamide or $\epsilon$-caprolactam in the presence of bases by known methods, for example by the method described in DE-A 1 247 646.

Suitable fillers (C) are reinforcing fillers, such as pyrogenic or precipitated silica and carbon black, and carbonate-, silicate- or oxide-containing minerals with little or no reinforcing effect. The surfaces of the fillers may be pretreated. Silanized pyrogenic silicas and ground natural chalks or precipitated chalks coated with stearic acid are particularly preferred. It is particularly preferred to use 60 to 120 parts by weight chalk and 10 to 30 parts by weight pyrogenic silica, based in each case on 100 parts by weight component (A).

Suitable tin catalysts (D) are dialkyl tin carboxylates, for example dibutyl tin acetate, dibutyl tin dilaurate, dibutyl tin bis-(2-ethylhexanoate). Alternatively, the corresponding dioctyl derivatives may be used. In addition, dialkkyl tin oxides, such as dibutyl tin oxide or dioctyl tin oxide, are present in solutions with aminoalkyl alkoxysilanes (F), as described in EP application 88 117 221.7 for oxime-curing 1-C-RTV compounds, have proved to be particularly suitable.

Suitable aminoalkyl alkoxysilanes (F) are such compounds as $H_2NCH_2CH_2CH_2Si(OC_2H_5)_3$, $H_2NCH_2CH_2NHCH_2CH_2CH_2Si(OCH_3)_3$, $H_2NCH_2CH_2CH_2SiCH_3(OC_2H_5)_2$ and $HN[CH_2CH_2CH_2Si(OC_2H_5)_3]_2$. Other compounds of this type have been described as primers or crosslinking agents for silicone pastes, cf. for example US-A 3,888,815.

In the same way as known 1-C-RTV compounds, the compounds according to the invention may be produced in planetary mixers, butterfly mixers, dissolvers, continuous mixing screws or other machines suitable for the production of pastes. The compounds have to be protected against atmospheric moisture during production and storage. For the production of particularly reactive embodiments, the compounds may have to be mixed and packed in a dry inert gas atmosphere.

The invention is illustrated by the following Examples.

EXAMPLE 1

32.75 Parts by weight of an $\alpha,\omega$-dihydroxypolydimethyl siloxane, viscosity 80 Pas, and 26.2 parts by weight of an $\alpha,\omega$-bis-(trimethylsiloxy)-polydimethyl siloxane, viscosity 0.1 Pas, were mixed with 0.5 part by weight H₂NCH₂CH₂CH₂Si(OC₂H₅)₃ in a planetary mixer. 30.0 Parts by weight of a ground natural chalk treated with stearic acid and 3.0 parts by weight of a pigment paste containing 50% TiO₂ in silicone oil were then added and dispersed, followed by the addition of 2.8 parts by weight methyl-bis-(N-methylbenzamido)-ethoxysilane, 4.5 parts by weight of a hydrophobicized pyrogenic silica and 0.25 part by weight of a solution of dibutyl tin oxide in H₂NCH₂CH₂CH₂Si(OC₂H₅)₃ prepared in the absence of moisture at 100° C. The catalyst solution had a tin content of 20%.

Glass test specimens with joint dimensions of 12 mm×12 mm×50 mm were prepared from the paste in accordance with DIN 52 455 and tested for tensile stress/elongation behavior.

| | |
|---|---|
| Tensile stress at 100% elongation | 0.26 MPa |
| Ultimate tensile strength | 0.33 MPa |
| Elongation at break | 200% |

After curing for 14 days, the test specimens had a Shore A hardness (DIN 53 505) of 17. The hardness test specimens were subjected to a weathering test for 2 months at 55° C. /95% relative air humidity. After subsequent storage for 1 week in a standard conditioning atmosphere, the test specimens had Shore A hardnesses of 15 to 18. There were no signs of the embrittlement which many 1-C-RTV compounds show under the described conditions.

EXAMPLE 2

32.1 Parts by weight of an α,ω-dihydroxypolydimethyl siloxane, viscosity 80 Pas, 26.2 parts by weight of an α,ωbis-(trimethylsiloxy)-polydimethyl siloxane, viscosity 0.1 Pa.s, and 0.5 part by weight H₂NCH₂CH₂NHCH₂CH₂CH₂Si(OCH₃)₃ were mixed. 30.0 Parts by weight of the natural chalk used in Example 1 and 3.0 parts by weight of the pigment paste were then incorporated by dispersion. 3.5 Parts by weight

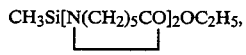

CH₃Si[N(CH₂)₅CO]₂OC₂H₅, 4.5 parts by weight of the hydrophobicized pyrogenic silica and 0.20 part by weight of the tin catalyst solution used in Example 1 were then added. The testing of tensile properties were performed according to DIN 52455 as described in Example 1. The following results were obtained:

| | |
|---|---|
| Tensile stress at 100% elongation | 0.24 MPa |
| Ultimate tensile strength | 0.31 MPa |
| Elongation at break | 240% |

After the weathering test described in Example 1, there were no signs of any embrittlement.

Comparative example 1. without silane (E)

Example 1 was repeated without addition of methyl-bis(N-methyl-benzamido)ethoxysilane. In order to avoid contact with atmospheric moisture, the resulting paste was filled into cartridges. After 3 days a soft rubber had formed in the cartridges. The experiment shows that the silane (E) is necessary for the production of a one-component sealant, which is stable in the absence of moisture.

Comparative example 2. without silane (F)

Example 1 was repeated without addition of any silane (F). No H₂NCH₂CH₂CH₂Si(OC₂H₅)₃ was added and the catalyst solution of dibutyltinoxide in H₂NCH₂CH₂CH₂Si(O)C₂H₅)₃, which contained 20% tin, was replaced by the same quantity of dibutyltindilaurate. The product was storage stable in the absence of moisture. In contact with moisture it cured to a rubber with the following properties (DIN 52455):

| | |
|---|---|
| Tensile stress at 100% elongation | 0,15 MPa |
| Ultimate tensile strength | 0,16 MPa |
| Elongation at break | 110%. |

Vulcanized samples show good resistance to extreme weathering conditions. In this respect they were comparable to the products of the original example 2 which were tested for adhesion to different substrates. Strings of the pastes were applied on the substrates, listed below. After curing for one week under the influence of atmospheric moisture, the adhesion was evaluated qualitatively by pulling off the strings. In case of adhesive rupture, the samples were judged as having "no adhesion". In the case of cohesive failure within the string, the material was judged as having adhesion (adhesion—yes).

| Adhesion | Example 1 | Comparative Example 2 |
|---|---|---|
| Glass | yes | yes |
| Tiles | yes | yes |
| Aluminum | yes | no |
| Iron | yes | no |
| Copper | yes | no |
| PVC | yes | no |
| Acrylic glass | yes | no |
| Polycarbonate | yes | no. |

The test demonstrates that sealants, which contain no aminosilane (F), adhere to few substrates, only. The product, according to example one, adhered to all substrates tested.

In order to prove, that the introduction of dibutyltindilaurate in comparative example 2 has no negative influence on adhesion, Example 1 was repeated with equal amounts of dibutyldilaurate, instead of a solution of dibutyltinoxide in the silane H₂NCH₂CH₂CH₂Si(OC₂H₅)₃. The adhesion properties of this paste were similar to the original example 1.

What is claimed is:

1. A one-component silicone system which is vulcanizable under the effect of moisture which comprises a mixture of
    A) hydroxy-terminated polydimethyl siloxanes having a viscosity of 1 to 100 Pa.s;
    B) plasticizers which are optionally present;
    C) fillers; and
    D) a dialkyl tin (IV) catalyst,
    E) 2 to 30 parts by weight of a silane having the formula CH₃Si(OC₂H₅)X₂ in which
    X is either C₆H₅CON(CH₃)— or
    CO(CH₂)₅N— and

F) 0.1 to 5 parts by weight of an aminoalkyl alkoxysilane containing one or more basic nitrogen atoms connected to the silicon atom by at least 3 carbon atoms, wherein the molar ratio of components (E) to (F) being at least 2.5 and the parts by weight of components (E) and (F) are based on 100 parts by weight (A).

2. The one-component silicone system according to claim 2, wherein the molar ratio of components (E) to (F) does not exceed 10.

3. The one-component silicone system according to claim 1, wherein the molar ratio of components (E) to (F) does not exceed 6.

* * * * *

UNITED STATES PATENT AND TRADEMARK OFFICE
CERTIFICATE OF CORRECTION

PATENT NO.   : 5,434,198
DATED        : July 18, 1995
INVENTOR(S)  : Meurer, et al.

It is certified that error appears in the above-indentified patent and that said Letters Patent is hereby corrected as shown below:

Col. 6, line 1    Delete claim " 2 " and substitute claim -- 1 --

Signed and Sealed this

Twelfth Day of December, 1995

Attest:

BRUCE LEHMAN

*Attesting Officer*    Commissioner of Patents and Trademarks